United States Patent [19]

Ramesh et al.

[11] Patent Number: 5,597,858
[45] Date of Patent: Jan. 28, 1997

[54] HYDROPHOBICALLY ASSOCIATING DISPERSANTS USED IN FORMING POLYMER DISPERSIONS

[75] Inventors: Manian Ramesh, Lisle; Jeffrey R. Cramm, Winfield; Darrell L. Werges, Naperville; Christopher P. Howland, Aurora, all of Ill.

[73] Assignee: Nalco Chemical Company, Naperville, Ill.

[21] Appl. No.: 408,764

[22] Filed: Mar. 22, 1995

Related U.S. Application Data

[60] Division of Ser. No. 228,320, Apr. 15, 1994, abandoned, which is a continuation-in-part of Ser. No. 74,960, Jun. 10, 1993, abandoned.

[51] Int. Cl.$^6$ ............................................. C08L 13/02
[52] U.S. Cl. ...................... 524/458; 524/519; 524/521; 524/551; 524/555; 524/812; 524/813; 524/815; 526/192; 526/193; 526/201; 526/292.2; 526/292.95; 526/295; 526/307.3
[58] Field of Search ........................... 524/458, 812, 524/813, 815, 551, 555, 519, 521; 526/201, 295, 292.2, 292.95, 307.3, 192, 193

[56] References Cited

U.S. PATENT DOCUMENTS

| | | | |
|---|---|---|---|
| 4,380,600 | 4/1983 | Hosoda et al. | 524/458 |
| 4,403,063 | 9/1983 | Maslanka et al. | 524/458 |
| 4,414,353 | 11/1983 | Maslanka et al. | 524/458 |
| 4,835,234 | 5/1989 | Valint et al. | 526/258 |
| 4,929,655 | 5/1990 | Takeda et al. | 524/458 |
| 5,006,590 | 4/1991 | Takeda et al. | 524/458 |
| 5,403,883 | 4/1995 | Messner et al. | 524/458 |

*Primary Examiner*—Judy M. Reddick
*Attorney, Agent, or Firm*—Robert A. Miller; James J. Drake

[57] ABSTRACT

An improved process for the preparing a dispersions of water soluble cationic polymers in an aqueous salt solution is disclosed. The improvement comprises using as a polymeric dispersion stabilizer a water soluble hydrophobically associating copolymer of diallyldimethylammonium chloride and a monomer selected from the group consisting of:

$$CH_2=C-R_1 \quad R_2 \atop | \quad\quad\quad\quad | \atop O=C-A_1-B_1-N^+-QX_1^- \atop | \atop R_3} \quad (III)$$

and alkyl esters of acrylic acid, where $R_1$ is either hydrogen or $CH_3$; $R_2$ and $R_3$ are each an alkyl group having 1 to 3 carbon atoms; $A_1$ is either an oxygen atom or NH; $B_1$ is either an alkylene group having 2 to 4 carbon atoms or a hydroxypropylene group, Q is benzyl, or $C_6$–$C_{20}$ alkyl, and $X_1^-$ is an anionic counterion.

12 Claims, No Drawings

HYDROPHOBICALLY ASSOCIATING DISPERSANTS USED IN FORMING POLYMER DISPERSIONS

This application is a division of application Ser. No. 08/228,320 filed Apr. 15, 1994, now abandoned, which in turn is a continuation-in-part of application Ser. No. 08/074,960 filed Jun. 10, 1993 now abandoned.

The present invention relates to the use of novel hydrophobically associating dispersants in a process for the production of water soluble polymer dispersions which are widely used as flocculating agents for waste water treatment, retention and drainage aids in the pulp and paper industry, and the like.

BACKGROUND OF THE INVENTION

Conventional processes for the preparation of water soluble cationic polymers which are useful as flocculants for waste water treatment and as papermaking chemical additives include aqueous solution polymerization, water-in-oil emulsion polymerization, and suspension or bead polymerization in hydrophobic solvent.

Other methods include the preparation of water soluble, nonionic or anionic polymers by precipitation polymerization in an aqueous solution of ammonium sulfate. Still others have carried out the polymerization of water soluble monomers in an aqueous solution of salt in the presence of a polyhydric alcohol or a polyelectrolyte as a dispersant.

Takeda et al. U.S. Pat. No. 4,929,655, which issued on May 29, 1990, the disclosure of which is hereinafter incorporated by reference into this specification, provides a novel process for preparing a water soluble polymer dispersion which overcomes the many disadvantages of solution polymerization, water-in-oil emulsion polymerization and suspension polymerization processes. This process for the production of a water soluble polymer dispersion includes the polymerization of water soluble monomers including 5 to 100 mole % of a cationic monomer represented by formula (I) below, 0 to 50 mole % of another cationic monomer represented by formula (II) below and 0 to 95 mole % of (meth)acrylamide in the presence of 1 to 10% by weight (based on the total weight of monomers) of an organic high molecular weight multivalent cation dispersant containing at least one monomer of formula (II) below (i.e., a hydrophilic monomer), in an aqueous multivalent anionic salt solution having a concentration of 15% by weight or more. Cationic monomers represented by Formula I have the structural formula:

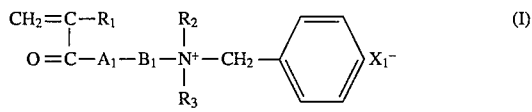
(I)

where $R_1$ is either hydrogen or $CH_3$; $R_2$ and $R_3$ are each an alkyl group having 1 to 3 carbon atoms; $A_1$ is either an oxygen atom or NH; $B_1$ is either an alkylene group having 2 to 4 carbon atoms or a hydroxypropylene group, and $X_1^-$ is an anionic counterion.

Cationic monomers represented by formula (II) have the chemical structure:

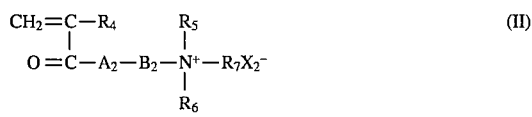
(II)

where $R_4$ is either hydrogen or $CH_3$; $R_5$ and $R_6$ are each an alkyl group having 1 to 2 carbon atoms; $R_7$ is a hydrogen atom or an alkyl group having 1 to 2 carbon atoms; $A_2$ is either an oxygen atom or NH; $B_2$ is either an alkylene group having 2 to 4 carbon atoms or a hydroxypropylene group and $X_2^-$ is an anionic counterion.

Takeda et al. U.S. Pat. No. 5,006,590, which issued on Apr. 9, 1991, the disclosure of which is hereinafter incorporated by reference into the specification, is similar to Takeda '655, except that it teaches the use of a dual dispersant system wherein polymerization is carded out in the presence of: (1) a water soluble cationic polymer which is insoluble in an aqueous solution of a polyvalent anion salt; and (2) a water soluble cationic polymer which is soluble in an aqueous solution of a polyvalent anion salt. The water soluble cationic polymer that is insoluble in the aqueous solution of polyvalent anion salt contains at least 5 mole % of cationic monomer units represented by the aforementioned formula (I) above and the water soluble cationic polymer that is soluble in the aqueous solution of a polyvalent anion salt contains at least 20 mole % of cationic monomer units represented by formula (II) above.

Although the final polymer dispersion viscosities are satisfactory, i.e., 1,000 cps or below, the processes disclosed in U.S. Pat. Nos. 4,929,655 and 5,006,590 both proceed through very high process viscosities (i.e., >100,000 cps), which require the use of a specially designed high viscosity polymerization reactor. Due to these high process viscosities, the methods disclosed in U.S. Pat. Nos. 4,929,655 and 5,006,590 can only be used in the synthesis of polymer dispersions containing relatively low polymer content (i.e., 15 to 20%) by weight.

That is, in the dispersion polymerization processes discussed above, a polymer, for example, an acrylamide (AcAm)/dimethylaminoethyl-acrylate benzyl chloride quaternary (DMAEA.BCQ)/dimethyl-aminoethylacrylate methyl chloride quaternary (DMAEA.MCQ) terpolymer particle is adsorbed or grafted by dispersants such as polydimethylaminoethylacrylate, methylchloride quaternary (polyDMAEA.MCQ) and colloidal stabilization is attained. During this process the hydrodynamic volume of the particle, consisting of water, salt, monomers, macro radical, and dispersant, is significantly increased. This increase is presumably due to the hydrophilic nature of polydimethylaminoethylacrylate methyl chloride quaternary (DMAEA.MCQ) which is highly extended in the polymerization medium. The increase in hydrodynamic volume results in a relative increase in the bulk viscosity.

We have discovered that if the dispersion polymerization is carried out in the presence of a hydrophobically associating dispersant comprising a copolymer of diallyldimethylammonium chloride and a surface active monomer selected from the group of monomers having the formula:

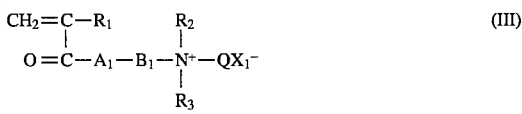
(III)

where $R_1$ is either hydrogen or $CH_3$; $R_2$ and $R_3$ are each an alkyl group having 1 to 3 carbon atoms; $A_1$ is either an oxygen atom or NH; $B_1$ is either an alkylene group having 2 to 4 carbon atoms or a hydroxypropylene group, Q is benzyl, or $C_6$–$C_{20}$ alkyl, and $X_1^-$ is an anionic counterion and alkyl esters of acrylic acid process viscosity during polymerization may be maintained below about 10,000 cps permitting the use of conventional reactors.

The present invention also provides many additional advantages which shall become apparent as described below.

SUMMARY OF THE INVENTION

This invention is directed to an improved process for preparing dispersions of cationic vinyl addition polymers in an aqueous salt solution using a polymeric dispersant, the improvement comprising using as the polymeric dispersant, a hydrophobically associating copolymer of diallyldimethylammonium chloride which is completely soluble in water and only very sparingly soluble in the aqueous salt solution.

The hydrophobically associating water soluble dispersant used in forming polymer dispersions in accord with this invention comprises a copolymer of diallyldimethylammonium chloride and a hydrophobically associating surface active monomer selected from the group consisting of monomers of the formula:

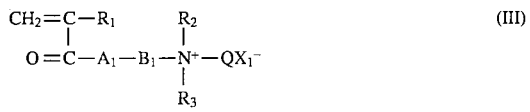  (III)

and alkyl esters of acrylic acid, wherein $R_1$ is either hydrogen or $CH_3$; $R_2$ and $R_3$ are each an alkyl group having 1 to 3 carbon atoms; $A_1$ is either an oxygen atom or NH; $B_1$ is either an alkylene group having 2 to 4 carbon atoms or a hydroxypropylene group, Q is benzyl, or $C_6$–$C_{20}$ alkyl, and $X_1^-$ is an anionic counterion.

Examples of particular monomers meeting the criteria of Formula III include: N-substituted quaternary dialkylaminoalkylacrylates having an N-substituted group including from 6 to 20 carbon atoms, N-substituted quaternary dialkylaminoalkylmethacrylates having an N-substituted group including from 6 to 20 carbons, N-substituted quaternary dialkylaminoalkyl(meth)acrylamides having an N-substituted group including from 6 to 20 carbons, and alkyl esters of acrylic acid.

The novel hydrophobically associating dispersants according to the present invention are particularly useful in preparing water soluble polymer dispersions. The dispersion is prepared by polymerizing a water soluble mixture of two cationic monomers represented by the formulas (I) and (II) respectively.

Formula I is:

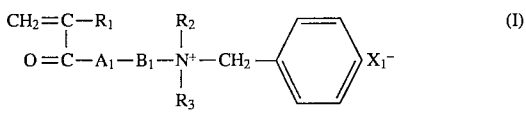  (I)

where $R_1$ is either hydrogen or $CH_3$; $R_2$ and $R_3$ are each an alkyl group having 1 to 3 carbon atoms; $A_1$ is either an oxygen atom or NH; $B_1$ is either an alkylene group having 2 to 4 carbon atoms or a hydroxypropylene group, and $X_1^-$ is an anionic counterion.

Formula II is:

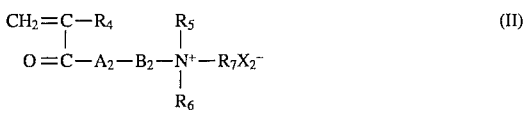  (II)

where $R_4$ is either hydrogen or $CH_3$; $R_5$ and $R_6$ are each an alkyl group having 1 to 2 carbon atoms; $R_7$ is a hydrogen atom or an alkyl group having 1 to 2 carbon atoms; $A_2$ is either an oxygen atom or NH; $B_2$ is either an alkylene group having 2 to 4 carbon atoms or a hydroxypropylene group and $X_2^-$ is an anionic counterion. The water soluble mixture also may include (meth)acrylamide.

The polymerization is carried out in an aqueous solution of a polyvalent anion salt. In accordance with the invention, polymerization is carried out in the presence of the hydrophobically associating dispersant of this invention which comprises a copolymer of diallyldimethylammonium chloride monomer and a monomer from the group consisting of the monomers of formula (III) above and alkyl esters of acrylic acid.

Other and further objects, advantages and features of the present invention will be understood by reference to the following specification in conjunction with the annexed drawings.

DESCRIPTION OF THE PREFERRED EMBODIMENTS

The hydrophobically associating dispersant according to the present invention is used to form polymer dispersions. These dispersants are copolymers of diallyldimethylammonium chloride monomer (DADMAC) and a hydrophobically associating surface active monomer selected from the group consisting of monomers having the formula:

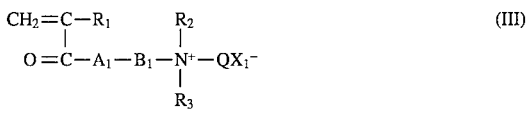  (III)

and alkyl esters of acrylic acid, where $R_1$ is either hydrogen or $CH_3$; $R_2$ and $R_3$ are each an alkyl group having 1 to 3 carbon atoms; $A_1$ is either an oxygen atom or NH; $B_1$ is either an alkylene group having 2 to 4 carbon atoms or a hydroxypropylene group, Q is benzyl, or $C_6$–$C_{20}$ alkyl, and $X_1^-$ is an anionic counterion. Examples of suitable monomers include: $C_6$–$C_{20}$ N-substituted quaternary dialkylaminoalkylacrylates (DMAEA), $C_6$–$C_{20}$ N-substituted quaternary dialkylaminoalkylmethacrylates (DMAEM), $C_6$–$C_{20}$ N-substituted quaternary dialkylaminoalkyl(meth)acrylamides, and alkyl and aryl/alkyl esters of acrylic acid such as 2-ethylhexylacrylate.

The DADMAC can be prepared in accordance with any conventional manner such as the technique described in Hunter et al. U.S. Pat. No. 4,151,202, which issued on Apr. 24, 1979, the disclosure of which is hereinafter incorporated by reference into this specification.

The surface active co-monomer of formula III is preferably an N-substituted quaternary dialkylaminoalkylacrylate selected from the group consisting of: dialkylaminoalkylacrylates having an N-substituted quaternary group having from 6 to 20 carbons, for example, dimethylaminoethylacrylate benzyl chloride quaternary and dimethylaminoethylacrylate cetyl chloride quaternary.

The quaternized dialkylaminoalkylmethacrylate is preferably selected from the group consisting of: dialkyl-aminoalkylmethacrylates having an N-substituted quaternary group including from 6 to 20 carbons, for example, dimethylamino-ethylmethacrylate benzyl chloride quaternary and dimethyl-aminoethylmethacrylate cetyl chloride quaternary.

The hydrophobically associating dispersant polymer according to the present invention has a molar ratio of diallyldimethylammonium chloride monomer to hydrophobically associating surface active monomer in the range between about 99:1 to about 20:80, preferably 90:10.

We have discovered that the copolymer dispersant of the present invention may be made in both batch and semi-batch processes. A semi-batch process used to make the hydrophobically associating dispersants comprises the following steps:

a. adding an aqueous solution containing 1–19% by weight diallyldimethylammonium chloride to a polymerization reaction vessel;

b. heating the diallyldimethylammonium chloride solution to a temperature in the range between about 47° C. to about 57° C.;

c. adding a polymerization initiator dropwise to the diallyldimethylammonium chloride in an amount between about 0.05 to about 0.40 weight percent based on the total weight of the solution;

d. adding a solution of the hydrophobically associating surface active monomer dropwise to the diallyldimethylammonium chloride in an amount between about 3 to about 19 weight percent of the diallyldimethylammonium chloride; and e. heating the mixture of diallyldimethylammonium chloride, polymer initiator and hydrophobically associating to a temperature in the range between about 47° C. to about 82° C.

Typically, deionized water is added periodically as needed during the polymerization process in a total amount between about 63 to about 88 weight percent. In some instances, it is preferable to mix the diallyldimethylammonium chloride with NaCl and deionized water prior to addition to the reaction vessel. The NaCl is added in an amount between about 2 to about 3.5 weight percent and the deionized water is added in an amount between about 1 to about 2.5 weight percent. This diallyldimethylammonium chloride solution has a concentration of diallyldimethylammonium chloride in the range between about 50 to about 65.

This semi-batch process produces a hydrophobically associating dispersant with a pH in the range from about 3.5 to about 4.5.

The diallyldimethylammonium chloride, polymer initiator and hydrophobically associating surface active monomer are heated at a temperature in the range between about 47° C. to about 57° C. for a period of between about 6 to 8 hours. Thereafter, the temperature of the reaction vessel is increased to about 72° C. to about 82° C. for a period of between about 5 to about 7 hours. After polymerization has been completed the copolymer product is typically diluted with deionized water, cooled and recovered.

The polymerization initiator is selected from the group consisting of 2,2'-azobis(2-amidinopropane) hydrochloride (Vazo® 50), ammonium persulfate, 2,2'-azobis(N,N'-dimethylene isobutyramidine) dihydrochloride (Vazo® 044), and ammonium persulfate/sodium meta bisulfite. Other conventional polymerization initiators may be added.

A batch reaction may also be used to prepare the hydrophobically associating dispersants of the invention. This is discussed in more detail in the following examples.

The novel hydrophobically associating dispersants according to the present invention are particularly useful in processes for preparing water soluble polymer dispersions. These dispersions are prepared by polymerizing (meth)acrylamide and a water soluble mixture of cationic monomers represented by the following general formulas (I) and (II). Formula I is:

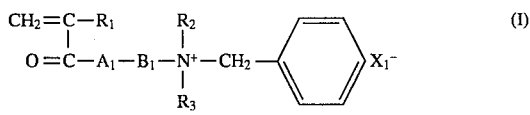

where $R_1$ is either hydrogen or $CH_3$; $R_2$ and $R_3$ are each an alkyl group having 1 to 3 carbon atoms; $A_1$ is either an oxygen atom or NH; $B_1$ is either an alkylene group having 2 to 4 carbon atoms or a hydroxypropylene group, and $X_1^-$ is an anionic counterion.

Formula (II) is:

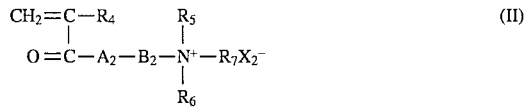

where $R_4$ is either hydrogen or $CH_3$; $R_5$ and $R_6$ are each an alkyl group having 1 to 2 carbon atoms; $R_7$ is a hydrogen atom or an alkyl group having 1 to 2 carbon atoms; $A_2$ is either an oxygen atom or NH; $B_2$ is either an alkylene group having 2 to 4 carbon atoms or a hydroxypropylene group and $X_2^-$ is an anionic counterion; in an aqueous solution of a polyvalent anion salt; wherein the polymerization is carried out in the presence of the hydrophobically associating dispersant of the invention.

The (meth)acrylamide is typically present in an amount in the range between about 20 to about 95 mole %, the cationic monomer represented by the formula (I) is typically present in an amount between about 5 to about 50 mole %; and the cationic monomer represented by the formula (II) is typically present in an amount between about 0 to about 50 mole %. The use of the cationic monomer represented by the general formula (II) is optional. The hydrophobically associating dispersant of the invention is present in an amount between about 2.5 to about 10 weight %, based on the total weight of the monomers in the dispersion.

Examples of monomers represented by the general formula (I) include quaternary monomers obtained by treating dimethylaminoethyl (meth)acrylate, diethylaminoethyl (meth)acrylate, dimethylaminopropyl (meth)acrylamide and dimethylhydroxypropyl (meth)acrylate, diethylaminopropyl (meth)acrylamide and dimethylaminohydroxylpropyl (meth)acrylate with benzyl chloride. One preferred monomer is N-benzyl-N-(meth)acryloyloxyethyl-N,N-dimethylammonium chloride.

Examples of monomers represented by the general formula (II) include methylated and ethylated quaternary salts of dimethylaminoethyl (meth)acrylate, diethylaminoethyl (meth)acrylate, dimethylaminopropyl (meth)acrylamide, diethylaminopropyl (meth)acrylamide and dimethylhydroxypropyl (meth)acrylate. One preferred monomer is N-(meth)acryloyloxyethyl-N,N,N-trimethyl ammonium chloride.

The multivalent anionic salt used to deposit the polymer in the present invention is a sulfate or a phosphate, and typical examples of these salts include ammonium sulfate, sodium sulfate, magnesium sulfate, aluminum sulfate, ammonium hydrogenphosphate, sodium hydrogenphosphate and potassium hydrogenphosphate. The salt is used in the form a salt aqueous solution at a concentration of 15.75% or more, preferably 16.5% by weight or more.

The hydrophobically associating dispersants of this invention are soluble in water and are only very sparingly soluble in the aqueous salt solution in which polymerization occurs.

The hydrophobically associating polymer dispersants useful in this invention typically have molecular weights in the range of from about 50,000 to about 5,000,000. Preferred polymers have molecular weights in the range of from 100,000 to about 3,000,000, and most preferably from about 300,000 to about 1,500,000.

Utilizing the hydrophobically associating dispersant of the invention permits the use of conventional reactors to prepare water soluble dispersion polymers since the process viscosity during polymerization may be maintained below about 10,000 cps, preferably below about 5,000 cps, and most preferably below about 3,000 cps.

The present invention can best be understood by reference to the following working and comparative examples.

EXAMPLE 1

A hydrophobically associating dispersant was formed from diallyldimethylammonium chloride (DADMAC) monomer and dimethylaminoethylmethacrylate cetyl chloride quaternary (DMAEM.CCQ) monomers using a batch process. The following reagents were used:

| | | |
|---|---|---|
| 251.30 grams | 62% Solution of DADMAC |
| 150.00 grams | 20% Solution of DMAEM.CCQ |
| 0.30 grams | Versene ® brand ethylene diamine tetraacetic acid, sodium salt |
| 10.00 grams | Adipic Acid |
| 15.00 grams | 25% Solution of Ammonium Persulfate |
| 75.08 grams | Deionized Water |

The DADMAC solution was added to a mixture of DMAEM.CCQ, adipic acid, Versene, and deionized water in a 1.5 liter reactor equipped with a mechancal stirrer, thermocouple, nitrogen inlet, and addition funnel. This reaction mixture was then heated to about 50° C. and thereafter the ammonium persulfate was added. The reaction vessel was purged with nitrogen at 10 cc/min. and stirred at about 250 rpm. After 30 minutes a precipitate began to form so an additional 154.76 grams of a 62% solution of DADMAC, 10 grams of a 25% solution of ammonium persulfate and 0.10 grams of Versene were added to the reaction vessel. Thereafter, the temperature of mixture was increased to 65° C. for 6 hours and then cooled to ambient temperature. The final molar ratio of DADMAC to DMAEM.CCQ was 96.68% to 3.32%.

A preparation of DMAEM.CBQ (dimethylaminoethylmethacrylate cetyl bromide quaternary) was effected as follows:

| | | |
|---|---|---|
| 80.00 grams | 97% Cetyl Bromide |
| 40.00 grams | 99% DMAEM |
| 0.08 grams | Hydroquinnone |
| 500.00 grams | Ethanol |

The above reactants were combined and heated at reflux for 4 hours. The solvent (i.e., ethanol) was removed under reduced pressure. A gummy liquid upon cooling afforded pale pink colored solid DMAEM.CBQ monomer in 96% yield. This monomer was then dissolved in deionized water to a desired dilution.

The preparation of DMAEM.CCQ was effected by stirring an aqueous solution (25% actives) of DMAEM.CBQ (1,000 grams), prepared as above, with Amberlite IRA-400 (Cl⁻) ion exchange resin for 30 minutes. The resin was filtered and the monomer used in subsequent polymerizations.

EXAMPLE 2

A hydrophobically associating dispersant was formed from 90 mole percent DADMAC and 10 mole percent dimethylaminoethylacrylate benzyl chloride quaternary (DMAEA.BCQ) monomers. A semi-batch process was used to prepare the polymer. The following reagents were used:

| | | |
|---|---|---|
| 272.1 grams | 62% Solution of DADMAC |
| 39.13 grams | 80% Solution of DMAEA.BCQ |
| 0.20 grams | Versene |
| 15.00 grams | 25% Solution of Ammonium Persulfate |
| 673.57 grams | Deionized Water |

DADMAC and 100 grams of deionized water were placed within a polymerization reaction vessel which was purged with nitrogen at 10 cc/min. Thereafter, the ammonium persulfate was added dropwise to the reaction vessel via a syringe pump for 2 hours. Simultaneously, DMAEA.BCQ was added dropwise to the reaction vessel via a syringe pump for 2 hours. The DMAEA.BCQ was diluted with 100 grams of deionized water prior to being loaded into the syringe pump. Thereafter, the remaining deionized water and Versene were added to the reaction vessel which was then heated at 65° C. for 6 hours.

EXAMPLE 3

A hydrophobically associating dispersant was formed from 80% DADMAC and 20% dimethylaminoethylmethacrylate cetyl chloride quaternary (DMAEM.CCQ) monomers. The following reagents were used:

| | | |
|---|---|---|
| 188.02 grams | 62% Solution of DADMAC |
| 83.43 grams | DMAEM.CCQ |
| 0.20 grams | Versene |
| 1.17 grams | Vazo 50 |
| 727.03 grams | Deionized Water |
| 0.15 grams | $H_2SO_4$ |

DADMAC was placed within a polymerization reaction vessel which was purged with nitrogen at 10 ml/min. and stirred at 300 rpm. The pH was adjusted to 3.5 by addition of $H_2SO_4$. 150 ml of deionized water was added to the DADMAC. This was followed by the dropwise addition of Vazo 50 and DMAEA. CCQ via separate syringe pumps for 2 hours. The DMAEA.CCQ was diluted with 100 grams of deionized water. The reaction vessel was then heated at 65° C. for 4.5 hours. Between 1.5 to 2 hours 180 ml of deionized water was again added. After 4.5 hours the temperature was raised to 70° C. for 0.5 hours. Thereafter, the resulting polymer was diluted with the remaining deionized water, cooled and stored.

EXAMPLE 4

A hydrophobically associating dispersant was formed from 90% DADMAC and 10% dimethylaminoethylacrylate benzyl chloride quaternary (DMAEA.BCQ) monomers. The following reagents were used using the equipment described in Example 1:

| | | |
|---|---|---|
| 251.79 grams | 67% Solution of DADMAC |
| 39.13 grams | 80% Solution of DMAEA.BCQ |
| 0.20 grams | Versene |
| 3.36 grams | Vazo 50 |
| 678.00 grams | Deionized Water |
| 27.52 | NaCl |

The semi-batch procedure was used as follows:

(1) A DADMAC solution was prepared by evaporating 272.10 grams of DADMAC monomer (62% actives) for 30 minutes. A solution comprising 251.79 grams of a 67% solution of DADMAC and 27.52 grams of NaCl was placed in a reactor.

(2) The polymerization reaction vessel was then purged with nitrogen, stirred at 200 rpm and heated to 57° C.

(3) Then 40 mg of Versene were added to the reaction vessel.

(4) 39.13 grams of DMAEA.BCQ were diluted with 15.87 grams of deionized water, then 160 mg of Versene were added, stirred and loaded into a syringe pump.

(5) 500 grams of water were disposed in a funnel adjacent to the reaction vessel and nitrogen sparged continuously.

(6) 1.68 grams of Vazo 50 were dissolved in 45.16 grams of deionized water and loaded into another syringe pump.

(7) At 57° C., 11.7 grams of the Vazo 50 solution were added to the reaction vessel, together with the dropwise addition of the DMAEA.BCQ.

(8) Additional deionized water was added from time to time as required.

(9) After 5 hours the temperature was raised to 82° C. for 1 hour.

(10) Thereafter, the resulting polymer was diluted with the remaining deionized water, cooled and stored.

This example was also performed without any sodium chloride. The dispersant obtained was identical in all respects to the above dispersant which utilized sodium chloride during its formation.

EXAMPLE 5

A dispersion of a water soluble cationic polymer was formed from the terpolymer of 65 mole % acrylamide (AcAm), 25 mole % dimethylaminoethyl acrylate benzyl chloride quaternary (DMAEA.BCQ), and 10 mole % dimethylaminoethyl acrylate methyl chloride quaternary (DMAEA.MCQ) was prepared. Initially, 40.336 grams of water, 14.405 grams of a 48.2% by weight aqueous solution of acrylamide, 12.678 grams of an 80% by weight aqueous solution of DMAEA.BCQ, 3.621 grams of an 80.5% by weight aqueous solution of DMAEA.MCQ, 4.930 grams of a hydrophobically associating dispersant comprising a copolymer of 90 mole % DADMAC and 10 mole % DMAEA.BCQ prepared in accordance with Example 4, 16 grams of ammonium sulfate, and 0.6 grams of glycerin were added to a reactor substantially as described in Example 1. The reaction vessel was degassed for approximately 30 minutes with nitrogen at 9 ml/min. The reaction mixture was heated to approximately 50° C. during the degassing and stirred at 400 rpm. After the 30 minutes of degassing at 9 ml/min., the nitrogen was reduced to 2 ml/min. and 0.4 grams of a 1% solution of a Vazo 50 and 0.03 grams of Versene were added to the reaction vessel. Thereafter, the reaction vessel was heated for another 4 hours at 50° C. to obtain the final water soluble polymer dispersion. The final product was filtered through a 100 mesh screen and <0.8 wt.% unfiltered material was removed.

The torque at Time=0 was 508 dynes/gm at 402 rpm. The maximum torque observed during the polymerization process was 820 dynes/gm at approximately 400 rpm. The final torque was 510 dynes/gin. The resulting polymer dispersion exhibited a viscosity of 257.5 cp.

EXAMPLE 6

A dispersion of a water soluble cationic polymer containing a copolymer of 90 mole % acrylamide (AcAm) and 10 mole % dimethylaminoethyl acrylate benzyl chloride quaternary (DMAEA.BCQ) was prepared. Initially, 40.987 grams of water, 20.528 grams of AcAm (48.4%), 8.387 grams of DMAEA.BCQ (50%), 4.712 grams of AcAm/ DMAEA.BCQ (90/10 mole %), 2.12 grams of a 20% by weight aqueous solution of the hydrophobically associating dispersant comprising a copolymer of 90 mole % DADMAC and 10 mole % DMAEA.BCQ prepared in accordance with Example 1, 15.55 grams of ammonium sulfate, and 0.7 grams of glycerin, were added to a conventional latex reaction vessel. The reaction vessel was degassed for approximately 30 minutes with nitrogen at 9 ml/min. The reaction mixture was heated to approximately 40° C. during the degassing and stirred at 400 rpm. After the 30 minutes of degassing at 9 ml/min., the nitrogen was reduced to 2 ml/min. and 0.566 grams of a 1% solution of a Vazo 44 and 0.03 grams of Versene were added to the reaction vessel. Thereafter, the reaction vessel was heated for another 4 hours at 40° C. to obtain the final water soluble polymer dispersion. The reaction mixture was cooled to ambient temperature, and 6.22 grams of sodium sulfate and 0.566 grams of acetic acid were added.

During the reaction, about 60ml of reaction mixture was withdrawn at 20 minute intervals and Brookfield Viscosity was measured. The viscosity at Time=0 was 16 cps at 400 rpm, at 25° C. The maximum viscosity observed during the polymerization process was 2100 cps at 40° C. The final viscosity prior to the addition of sodium sulfate was 1000 cp. The polymer dispersion exhibited a viscosity of 37.5 cp.

EXAMPLE 7

The following is a comparative study of the use of conventional dispersant of Takeda et al., U.S. Pat. No. 4,929,655 in the preparation of a water soluble polymer dispersion comprising 90 mole % acrylamide and 10 mole % DMAEA.BCQ in a three liter reactor. All of the samples set forth in Table 2 below yielded polymer dispersions without any significant gel formation. These dispersions also met the usual RSV/IV specifications; however, these samples proceeded through high process viscosities (i.e., 100,000 to >500,000 cps). Such high process viscosities require the use of custom built polymerization reaction vessels which are costly and inconvenient due to all of the conventional latex reaction vessel currently in use. The last entry in Table 1 exemplifies the efficiency of hydrophobically associating stabilizer in preparation of a polymer dispersion.

TABLE 1

| | [Dispersion of AcAm/DMAEA.BCQ] | | |
|---|---|---|---|
| Sample No. | Dispersant | Peak Visc. (cps) | RSV/IV (dL/gm) |
| 1 | poly(DMAEA.MCQ) | >500,000 | 19.6/15.98 |
| 2 | AcAm-co-DMAEA.MCQ | >300,000 | 19.2/15.36 |
| 3 | DADMAC-co-DMAEA.BCQ | 2100 | 19.9/16.20 |

EXAMPLE 8

A dispersion of a water soluble cationic polymer was containing a 65 mole % acrylamide (AcAm), 25 mole % dimethylaminoethyl acrylate benzyl chloride quaternary (DMAEA.BCQ), and 10 mole % dimethylaminoethyl acrylate methyl chloride quaternary (DMAEA.MCQ) was prepared. Initially, 40.336 grams of water, 14.405 grams of AcAm (48.2%), 12.678 of DMAEA.BCQ (80%), 3.621 grams of DMAEA.MCQ (80.5%), 4.930 grams of a hydrophobically associating dispersant comprising a copolymer of 90 mole % DADMAC and 10 mole % DMAEA.BCQ prepared in accordance with Example 4. 16 grams of ammonium sulfate, and 0.9 grams of glycerin, were added to a conventional reaction vessel substantially as described in Example 1. The reaction vessel was degassed for approximately 30 minutes with nitrogen at 9 ml/min. The reaction mixture was heated to approximately 48° C. during the degassing and stirred at 400 rpm. After the 30 minutes of degassing at 9 ml/min., the nitrogen was reduced to 2 ml/min. and 0.4 grams of a 1% solution of a Vazo 50 and 0.03 grams of Versene were added to the reaction vessel.

Thereafter, the reaction vessel was heated for another 4 hours at 48° C. to obtain the final water soluble polymer dispersion. Then 6 grams of ammonium sulfate and 1 gram of acetic acid were added to the polymer dispersion.

During the reaction, about 60ml of reaction mixture was withdrawn at 20 minute intervals and Brookfield Viscosity was measured. The Brookfield viscosity at Time=0 was 12 cp. The maximum viscosity observed during the polymerization process was 1700 cps (#3 spindle, at 12 rpm). After the addition of the 6 grams of ammonium sulfate, the polymer dispersion exhibited a Brookfield viscosity of 86 cps (#1 spindle at 60 rpm).

EXAMPLE 9

A dispersion of a water soluble cationic polymer containing 65 mole % acrylamide (AcAm), 25 mole % dimethylaminoethyl acrylate benzyl chloride quaternary (DMAEA.BCQ), and 10 mole % dimethylaminoethyl acrylate methyl chloride quaternary (DMAEA.MCQ) was prepared. Initially, 40.336 grams of water, 14.405 grams of AcAm (48.2%), 12.678 of DMAEA.BCQ (80%), 3.621 grams of DMAEA.MCQ (80.5%), 4.930 grams of a hydrophobically associating dispersant comprising a copolymer of 90 mole % DADMAC and 10 mole % DMAEA.BCQ substantially as described in Example 4, 15.50 grams of ammonium sulfate and 1.2 grams of glycerin were added to a conventional reaction vessel substantially as described in Example 1. The reaction vessel was degassed for approximately 30 minutes with nitrogen at 9 ml/min. The reaction mixture was heated to approximately 48° C. during the degassing and stirred at 1000 rpm. After the 30 minutes of degassing at 9 ml/min., the nitrogen was reduced to 2 ml/min. and 0.13 grams of a 1% solution of a Vazo 50 and 0.03 grams of Versene were added to the reaction vessel. Thereafter, the reaction vessel was heated for another 3 hours at 48° C. and a second batch of Vazo 50 initiator (0.27 grams) was added. The reaction proceeded for a further hour (total reaction time was 4 hours) to obtain the final water soluble polymer dispersion. Then 6.5 grams of ammonium sulfate and 1 gram of acetic acid were added to the polymer dispersion.

The Brookfield viscosity at Time=0 was 12 cp. The maximum viscosity observed during the polymerization process at approximately 1000 rpm was 1600 cp. The polymer dispersion after post-treatment exhibited a Brookfield viscosity of 70 cps (#1 spindle at 60 rpm).

EXAMPLE 10

The following experiments were conducted to determine whether the hydrophobically associating dispersants of the present invention would reduce the process viscosity of the polymerization of a dispersion comprising a terpolymer of 65 mole % acrylamide, 25 mole % DMAEA.BCQ and 10 mole % DMAEA.MCQ.

A 1000 gram batch of the aforementioned terpolymer was prepared using either a poly(DMAEA.MCQ) dispersant or a hydrophobic dispersant comprising 90 mole % of DADMAC and 10 mole % of DMAEA.BCQ. The results are set forth below in Table 2.

TABLE 2

| AcAm/DMAEA.BCQ/DMAEA.MCQ Dispersion | | |
|---|---|---|
| Run No. | Dispersant | Peak Viscosity |
| 1 | poly(DMAEA.MCQ) | >100,000 cps |
| 2 | DADMAC/DMAEA.BCQ | 1,700 cps |

Samples were withdrawn every 15 minutes and the Brookfield viscosity measured. The peak viscosity measured during run no. 1 using the conventional dispersant of Takeda et al. was >100,000 cps; whereas run no. 2 using the hydrophobically associating dispersant of the present invention exhibited a peak viscosity of only 1,700 cp. This comparison clearly indicates that the hydrophobically associating dispersant is capable of substantially reducing the process viscosity during polymerization of water soluble polymer dispersions.

EXAMPLE 11

The effect of hydrophobic stabilizers in reducing the process viscosities during the dispersion polymerizations was further investigated and the results are set forth below in Table 3.

TABLE 3

| Run # | Polymer | Stabilizer | Peak Viscosities (cps) | RSV/IV (dL/gm) |
|---|---|---|---|---|
| 1 | AcAm/DMAEA.BCQ (90/10) | DADMAC/DMAEA.BCQ[a] | 90 | 18.9/15.8 |
| 2 | AcAm/DMAEA.BCQ/DMAEA.MCQ[b] | DADMAC/DMAEA.BCQ[c] | 2100 | 21.6/16.2 |
| 3 | AcAm/DMAEA.BCQ/DMAEA.MCQ[d] | DADMAC/DMAEA.BCQ[c] | 1600 | 19.6/15.2 |
| 4 | AcAm/DMAEA.BCQ/DMAEA.MCQ[b] | DADMAC/DMAEA.BCQ[e] | 50,000 | Gelled |
| 5 | AcAm/DMAEA.BCQ/DMAEA.MCQ[b] | DADMAC/DMAEA.BCQ[a] | 650 | 21.6/15.8 |
| 6 | AcAm/DMAEA.BCQ/DMAEA.MCQ[b] | DADMAC/DMAEM.CCQ[h] | 2100 | 20.8/15.6 |
| 7 | AcAm/DMAEA.BCQ (90/10) | DADMAC/DMAEA.BCQ[a] | 600 | 19.9/16.2 |
| 8 | AcAm/DMAEA.BCQ/DMAEA.MCQ[b] | DADMAC/DMAEA.BCQ[f] | 3000 | 20.1/15.2 |
| 9 | AcAm/DMAEA.BCQ/DMAEA.MCQ[b] | DADMAC/DMAEA.BCQ[c] | 1800 | 19.6/15.3 |
| 10 | AcAm/DMAEA.BCQ (90/10) | DADMAC/EHA[g] | 720 | 20.8/15.6 |

[a] 90 mole % DADMAC and 10 mole % DMAEA.BCQ initiated with Vazo 44 (Ex. 12).
[b] 65 mole % AcAm, 25 mole % DMAEA.BCQ and 10 mole % DMAEA.MCQ.
[c] 90 mole % DADMAC and 10 mole % DMAEA.BCQ initiated with Vaxo 50 (Example 4).
[d] 70 mole % AcAm, 20 mole % DMAEA.BCQ and 10 mole % DMAEA.MCQ.
[e] 90 mole % DADMAC and 10 mole % DMAEA.BCQ initiated with ammonium persulfate. Gellation believed due to use of ionic initiator.
[f] 95 mole % DADMAC and 5 mole % DMAEA.BCQ initiated with Vazo 44.
[g] 90 mole % DADMAC and 10 mole % ethylhexyl acrylate initiated with Vazo 44.
[h] 80 mole % DADMAC and 20 mole % DMAEM.CCQ (Example 3).

The initiator used in the preparation of the dispersants was found to influence their efficiency in the dispersion process. Initiators like Vazo® 50 and Vazo® 044 appeared to function very efficiently in reducing the process viscosities of dispersion polymerizations; whereas initiators like, ammonium persulfate appeared to cause very high viscosities and resulted in the formation of a polymer gel as shown in run no. 4.

Table 4 above also demonstrates the efficiency of a DADMAC/EHA (ethylhexylacrylate) dispersant in reducing the process viscosity during polymerization of a water soluble polymer.

EXAMPLE 12

A hydrophobically associating dispersant containing 90% DADMAC and 10% dimethylaminoethylacrylate benzyl chloride quaternary (DMAEA.BCQ) monomers was prepared in a reactor similar to that described in Example 1. The following reagents were used:

| | |
|---|---|
| 272.09 grams | 62% Solution of DADMAC |
| 39.13 grams | 80% solution of DMAEA.BCQ |
| 1.20 grams | Vazo 44 |
| 626.58 grams | Deionized Water |
| 61.00 grams | NaCl |

The batch procedure was as follows:

(1) A solution comprising 272.09 grams of a 62% solution of DADMAC, 39.13 grams of DMAEA.BCQ (80%) and 61.00 grams of NaCl was placed in a reactor.

(2) The polymerization reaction vessel was then purged with nitrogen, stirred at 200 rpm and heated to 57° C.

(3) 100 grams of water were disposed in a funnel adjacent to the reaction vessel and nitrogen sparged continuously.

(4) 0.6 grams of Vazo 44 were dissolved in 49.40 grams of deionized water and loaded into another syringe pump.

(5) At 57° C., Vazo 44 solution was introduced to the reaction vessel dropwise, over a period of 4 hours.

(6) Deionized water addition was started 45 minutes after the beginning of Vazo 44 addition, at a rate of 33 g/hr.

(7) Afterwards the reaction mixture was kept at 57° C. for 2 hours.

(8) After 6 hours, the temperature was raised to 82° C. for 1 hour.

(9) Thereafter, the resulting polymer was diluted with the remaining deionized water, cooled and stored.

EXAMPLE 13

This example exemplifies the benefit of the hydrophobically associating stabilizer prepared in Example 12 in the manufacture of a dispersion polymer using a typical polymerization reactor. A dispersion of a water soluble cationic polymer was prepared containing a terpolymer of 65 mole % acrylamide (AcAm), 25 mole % dimethylaminoethyl acrylate benzyl chloride quaternary (DMAEA.BCQ), and 10 mole % dimethylaminoethyl acrylate methyl chloride quaternary (DMAEA.MCQ). Initially, 3373 kilograms of water, 499 kilograms of AcAm (100%), 912 kilograms of DMAEA.BCQ (80%), 262 kilograms of DMAEA.MCQ (80%), 354 kilograms of a hydrophobically associating dispersant (20%) comprising a copolymer of 90 mole % DADMAC and 10 mole % DMAEA.BCQ prepared in accordance with Example 12, 1096 kilograms of ammonium sulfate and 108 kilograms of glycerin were added to a polymerization reactor. The reaction mixture was heated to approximately 48° C. during the degassing and stirred at 190 rpm. The reaction vessel was degassed for approximately 30 minutes with nitrogen at 9 ml/min. After the 30 minutes of degassing at 9 ml/min., the nitrogen flow was reduced to 2 ml/min. and 0.04 kilograms of a 1% solution of a Vazo 50 (in 4.06 kg of water) and 4.69 kilograms of Versene (50% solution in water) were added to the reaction vessel. Thereafter, the reaction vessel was heated for another 2 hours at 48° C. A second addition of 0.24 kg Vazo in 4.06 kg water was added and the heating continued for another 2 hours to obtain the final water soluble polymer dispersion. Then 298 kilograms of ammonium sulfate, 70 kilograms of acetic acid and 7 kg of ammonium thiocyanate were added to the polymer dispersion. The Brookfield viscosity at Time=0 was 52 cp. The maximum viscosity observed during the polymerization process was 650 cps. The polymer dispersion after post-treatment exhibited a Brookfield viscosity of 62 cps (#1 spindle at 60 rpm).

EXAMPLE 14

A water soluble cationic polymer dispersion containing 25 weight percent of a terpolymer containing 20 mole % acrylamide (AcAm), 50 mole % dimethylaminoethyl acrylate benzyl chloride quaternary (DMAEA.BCQ), and 30 mole % dimethylaminoethyl acrylate methyl chloride quaternary (DMAEA.MCQ) was prepared.

This example describes the use of the hydrophobically associating dispersant prepared in Example 12 in the preparation of a dispersion polymer containing increased polymer solids. The dispersant systems of U.S. Pat. No. 4,929,655 would fail to produce polymer dispersions of the type described in this example because of high process viscosities.

Initially, 40.385 grams of water, 3.602 grams of AcAm (47.5%), 18.659 of DMAEA.BCQ (78.5%), 8.841 grams of DMAEA.MCQ (80%), 7.500 grams of a hydrophobically associating dispersant (20%) comprising a copolymer of 90 mole % DADMAC and 10 mole % DMAEA.BCQ prepared in Example 12, and 15.50 grams of ammonium sulfate were added to a typical polymerization vessel. The reaction vessel was degassed for approximately 30 minutes with nitrogen at 9 ml/min. The reaction mixture was heated to approximately 48° C. during the degassing and stirred at 1000 rpm. After the 30 minutes of degassing at 9 ml/min., the nitrogen was reduced to 2 ml/min. and 0.12 grams of a 1% solution of a Vazo 50 and 0.04 grams of Versene were added to the reaction vessel. Thereafter, the reaction vessel was heated for another 3 hours at 48° C. and a second batch of Vazo 50 initiator (0.28 grams) and DMAEA.BCQ (78.5%) 2.072 g was added. The reaction proceeded for a further 2 hours (total reaction time was 5 hours) to obtain the final water soluble polymer dispersion. Then 2.0 grams of ammonium sulfate and 1 gram of acetic acid were added to the polymer dispersion.

The Brookfield viscosity at Time=0 was 20 cp. The maximum viscosity observed during the polymerization process at approximately 1000 rpm was 600 cp. The polymer dispersion after post-treatment exhibited a Brookfield viscosity of 92 cps (#1 spindle at 60 rpm).

EXAMPLE 15

A polymer dispersion containing a higher polymer content (20% by weight) was prepared using a semi-batch polymerization process. This example exemplifies the benefits of using a hydrophobically associating stabilizer prepared in accordance with Example 12. Methods described for the preparation of polymer dispersions of the type shown in U.S. Pat. No. 4,929,655 and U.S. Pat. No. 5,006,590 would not be capable of forming the high solids polymer dispersions because of greatly increased viscosity during the polymerization.

A dispersion of a water soluble cationic polymer was formed from the terpolymer of 90 mole % acrylamide (AcAm), and 10 mole % dimethylaminoethyl acrylate benzyl chloride quaternary (DMAEA.BCQ). Initially, 34.772 grams of water, 29.300 grams of AcAm (48.0%), 6.680 of DMAEA.BCQ (80%), 4.500 grams of a hydrophobically associating dispersant (20%) comprising a copolymer of 90 mole % DADMAC and 10 mole % DMAEA.BCQ (Example 12), 16.50 grams of ammonium sulfate and 1.2 grams of glycerin were added to a conventional latex reaction vessel. The reaction vessel was degassed for approximately 30 minutes with nitrogen at 9 ml/min. The reaction mixture was heated to approximately 48° C. during the degassing and stirred at 1000 rpm. After the 30 minutes of degassing at 9 ml/min., the nitrogen was reduced to 2 ml/min. and 0.0012 grams of Vazo 50 in 0.1188 g DI water and 0.04 grams of Versene were added to the reaction vessel. Thereafter, the reaction vessel was heated for another 2 hours at 48° C. and a second batch of Vazo 50 initiator 0.0028 g in 0.2772 g DI water and DMAEA.BCQ (80%) 0.74 g were added. The reaction proceeded for a further 2 hours (total reaction time was 4 hours) to obtain the final water soluble polymer dispersion. Then 4.7 grams of sodium sulfate, 0.1 g ammonium thiocyanate and 1 gram of acetic acid were added to the polymer dispersion.

The Brookfield viscosity at Time=0 was 18 cp. The maximum viscosity observed during the polymerization process was 1000 cp. The polymer dispersion after post-treatment exhibited a Brookfield viscosity of 62 cps (#1 spindle at 60 rpm).

EXAMPLE 16

A water soluble cationic polymer dispersion containing a 29.9 weight percent acrylamide/DMAEA.BCQ/DMAEA.MCQ terpolymer (65/25/10 mole ratio) was prepared using a continuous feed polymerization process. This process was conducted using a 65/25/10 mole ratio of the monomers both in the initial monomer feed and in the post-initiation monomer feed. The combined monomer feed was divided about 62:38 between the initial monomer feed and the post-initiation monomer feed. No performed polymer seed was used. The reaction was carried out at 48° C. with stirring at 1,000 rpm. The post-initiation monomer feed was started at the end of the first 2.5 hour polymerization period, and this feed added at a substantially consistent addition rate over 30 minutes while the polymerization continues. The second charge of the initiator was added after the post-initiation monomer feed was charged, and the third charge of the initiator is added at the end of the fifth hour of polymerization. The polymerization was continued for 7 hours total, after which the reaction mixture was cooled to room temperature, the post-polymerization additions are made and the end-product reaction mixture was stirred for an additional 15 minutes. The final reaction mixture had an approximate viscosity of about 120 cps Brookfield. The polymer produced had an Intrinsic Viscosity of 12 to 17 dl/g and a Reduced Specific Viscosity of from 16 to 22 in 0.125 molar sodium nitrate solution. The reaction mixture components are set forth below in the following table.

| Ingredient | Ingredient Component(s) | Amount (grams) |
|---|---|---|
| Initial Charge | | |
| Dispersant (20%) | DADMAC/ DMAEA. BCQ(Ex. 12) | 75.000 |
| | DI Water | 371.210 |
| Polyvalent salt | Ammonium sulfate | 140.000 |
| | Glycerin | 7.500 |
| | Benzyl alcohol | 0.500 |
| Acrylamide (47%) | Acrylamide | 166.410 |
| DMAEA.BCQ (80%) | DMAEA.BCQ | 145.880 |
| DMAEA.BCQ (79.7%) | DMAEA.MCQ | 42.210 |
| | Versene | 0.300 |
| Initiator | Vazo 50 (1%) | 0.500 |
| In-production Charge | | |
| Acrylamide (47%) | Acrylamide | 106.900 |
| DMAEA.BCQ (80%) | DMAEA.BCQ | 88.670 |
| DMAEA.MCQ (79.7%) | DMAEA.MCQ | 25.420 |
| Initiator | Vazo 50 (1%) | 1.500 |
| Initiator | Vazo 50 (1%) | 1.500 |
| | Versene | 0.200 |
| Total Reaction Mixture Prior to Post-Polymerization Additions: | | 1,173.700 |
| Post-polymerization Charge | | |
| Salt | Sodium sulfate | 55.000 |
| | Acetic acid | 10.000 |
| Total Reaction Mixture After Post-Polymerization Additions: | | 1,238.700 |

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is:

1. A process for polymerizing:

(a) a first cationic monomer represented by the formula:

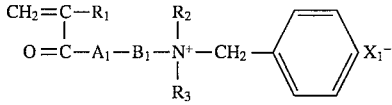

where $R_1$ is either hydrogen or $CH_3$; $R_2$ and $R_3$ are each an alkyl group having 1 to 3 carbon atoms; $A_1$ is either an oxygen atom or NH; $B_1$ is either an alkylene group having 2 to 4 carbon atoms or a hydroxypropylene group, and $X_1^-$ is an anionic counterion;

(b) a second cationic monomer represented by the formula:

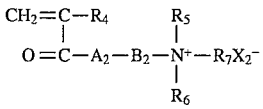

where $R_4$ is either hydrogen or $CH_3$; $R_5$ and $R_6$ are each an alkyl group having 1 to 2 carbon atoms; $R_7$ is a hydrogen atom or an alkyl group having 1 to 2 carbon atoms; $A_2$ is either an oxygen atom or NH; $B_2$ is either an alkylene group having 2 to 4 carbon atoms or a hydroxypropylene group and $X_2^-$ is an anionic counterion; and, (c) (meth)acrylamide in an aqueous solution of a polyvalent anion salt which comprises: conducting said polymerization in the presence of a hydrophobically associating dispersant copolymer of diallyldimethylammonium chloride and a monomer selected from the group consisting of:

a. a monomer having the formula

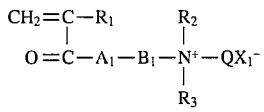

where $R_1$ is either hydrogen or $CH_3$; $R_2$ and $R_3$ are each an alkyl group having 1 to 3 carbon atoms; $A_1$ is either an oxygen atom or NH; $B_1$ is either an alkylene group having 2 to 4 carbon atoms or a hydroxypropylene group, Q is benzyl, or $C_6$–$C_{20}$ alkyl, and $X_1^-$ is an anionic counterion; and, b. an alkyl ester of acrylic acid.

2. The process of claim 1 wherein the hydrophobically associating dispersant copolymer is a copolymer of diallyldimethylammonium chloride and a monomer selected from the group consisting of: $C_6$–$C_{20}$ N-substituted quaternary dialkylaminoalkylacrylates (DMAEA), $C_6$–$C_{20}$ N-substituted quaternary dialkylaminoalkylmethacrylates (DMAEM), $C_6$–$C_{20}$ N-substituted quaternary dialkylaminoalkyl(meth)acrylamides, and alkyl esters of acrylic acid.

3. The process of claim 2 wherein the hydrophobically associating dispersant copolymer is a copolymer of diallyldimethylammonium chloride and a monomer selected from the group consisting of dimethylaminoethylacrylate benzyl chloride quaternary and dimethyl-aminoethylacrylate cetyl chloride quaternary.

4. The process of claim 2 wherein the hydrophobically associating dispersant copolymer is a copolymer of diallyldimethylammonium chloride and a monomer selected from the group consisting of dimethylaminoethylmethacrylate benzyl chloride quaternary and dimethylaminoethylmethacrylate cetyl chloride quaternary.

5. The process according to claim 1 wherein said alkyl ester of acrylic acid is ethyl hexyl acrylate.

6. The process of claim 1 wherein said first cationic monomer is present in an amount between about 5 to about 50 mole %.

7. The process of claim 1 wherein said second cationic monomer is present in an amount between about 0 to about 50 mole %.

8. The process of claim 1 wherein the hydrophobically associating dispersant copolymer is present in an amount between about 2.5 to about 10 weight %, based on the total weight of the first cationic monomer, second cationic monomer and (meth)acrylamide.

9. The process according to claim 1 wherein the first cationic monomer is selected from the group consisting of: the benzylchloride quaternaries of dimethylaminoethyl (meth)acrylate, diethylaminoethyl (meth)acrylate, dimethylaminopropyl (meth)acrylamide and dimethylhydroxypropyl (meth)acrylate, diethylaminopropyl (meth)acrylamide and dimethylaminohydroxylpropyl (meth)acrylate.

10. The process according to claim 1 wherein the second cationic monomer is selected from the group consisting of: the methyl and ethyl halide quaternary salts of dimethylaminoethyl (meth)acrylate, diethylaminoethyl (meth)acrylate, dimethylaminopropyl (meth)acrylamide, diethylaminopropyl (meth)acrylamide and dimethylhydroxypropyl (meth)acrylate.

11. The process according to claim 1 wherein the process viscosity during polymerization is less than about 10,000 cps.

12. An improved process for preparing dispersions of cationic vinyl addition polymers in an aqueous salt solution using a polymeric stabilizer, the improvement comprising using as the polymeric stabilizer, a hydrophobically associating copolymer of diallyldimethylammonium chloride which is completely soluble in water and only very sparingly soluble in the aqueous salt solution.

* * * * *